United States Patent

Morris

[15] 3,636,528

[45] Jan. 18, 1972

[54] HALF-BIT MEMORY CELL ARRAY WITH NONDESTRUCTIVE READOUT

[72] Inventor: Dennis E. Morris, Sunnyvale, Calif.

[73] Assignee: Shell Oil Company, New York, N.Y.

[22] Filed: Nov. 14, 1969

[21] Appl. No.: 876,622

[52] U.S. Cl. ..................................340/173 FF, 340/173 CA

[51] Int. Cl....................G11c 7/00, G11c 11/34, G11c 11/40

[58] Field of Search ....................340/173 R, 173 CA, 173 FF

[56] References Cited

UNITED STATES PATENTS 3,387,286 6/1968 Dennard ............................340/173 R 3,528,065 9/1970 Christensen.........................340/173 R

*Primary Examiner*—Bernard Konick

*Assistant Examiner*—Stuart Hecker

*Attorney*—J. H. McCarthy and Theodore E. Bieber

[57] ABSTRACT

A half-bit memory array featuring nondestructive reading uses two X address circuits addressed at different times and coupled by an inverter to read the memory element in a first portion of the operational cycle, and refresh it in a second portion of the operational cycle, without disturbing the gate electrode potential of the memory element at any time during the cycle, and without the refresh signal level being dependent upon the read signal level. Writing is accomplished by disabling the inverter to prevent transfer of the read information to the refresh circuit and substituting in its place a low-impedance data input signal. Fast switching is accomplished by reducing charge transfer operations to a minimum, and the circuit is entirely ratioless to improve speed of operation and circuit size.

11 Claims, 2 Drawing Figures

INVENTOR.
DENNIS E. MORRIS
BY
Mellin, Moore + Weissenberger
ATTORNEYS

INVENTOR.
DENNIS E. MORRIS
BY
Mellin, Moore & Weissenberger
ATTORNEYS

HALF-BIT MEMORY CELL ARRAY WITH NONDESTRUCTIVE READOUT

BACKGROUND OF THE INVENTION

MOSFET (metal oxide silicon field-effect transistor) memory devices of the prior art depend, in general, upon the transfer of incremental charges stored on the gate capacitance of one of the MOSFET circuit elements, on a line capacitance, or on a capacitive element formed on the chip. The limited capacitance of these storage elements severely limits the signal levels obtainable, and thus limits the operational speed of the device.

In other instances, the operation of the device depends upon the on-resistance ratio of several MOSFET elements. In the latter case, the ratioing of the MOSFET elements imposes undesirable design limitations and presents fabrication problems.

SUMMARY OF THE INVENTION

The present invention overcomes the disadvantages of the aforementioned prior art devices by providing a completely ratioless, fast-acting circuit in which all information transfer within the internal read-refresh loop is independent of any capacitive-charge-transfer time constant limitations. The circuit of this invention is a half-bit memory cell array, the name being derived from the fact that the cell is composed of only one inverter and shares the other inverter which makes up a normal storage flip-flop. The individual memory cells have an internal addressing capability responsive to only one of the two coordinates of the bit address (in this case, the X address). The other coordinate of the bit address (in this case, the Y address) is applied to circuitry common to a row of cells.

The circuit of this invention is distinguished, among other things, by the provision of two separate X-address inputs for each memory cell. The two X-address inputs are operative during different portions of the operational cycle and provide for the time separation of the read operation from the refresh operation.

To further improve the reliability of the device, the read operation is nondestructive. However, in order to allow periodic refreshing of the array, provision is made to automatically refresh and addressed memory cell immediately following its reading.

It is therefore the primary object of the invention to provide a fast-acting, ratioless random-access memory array circuit in which all switching operations are powered by a low-impedance bias source.

It is a further object of the invention to provide inverter means between the data-out bit line and the data-in bit line to render the data-in signal to the cell independent of the level of the data-out signal from the cell.

DESCRIPTION OF THE PREFERRED EMBODIMENT

Figure 1:
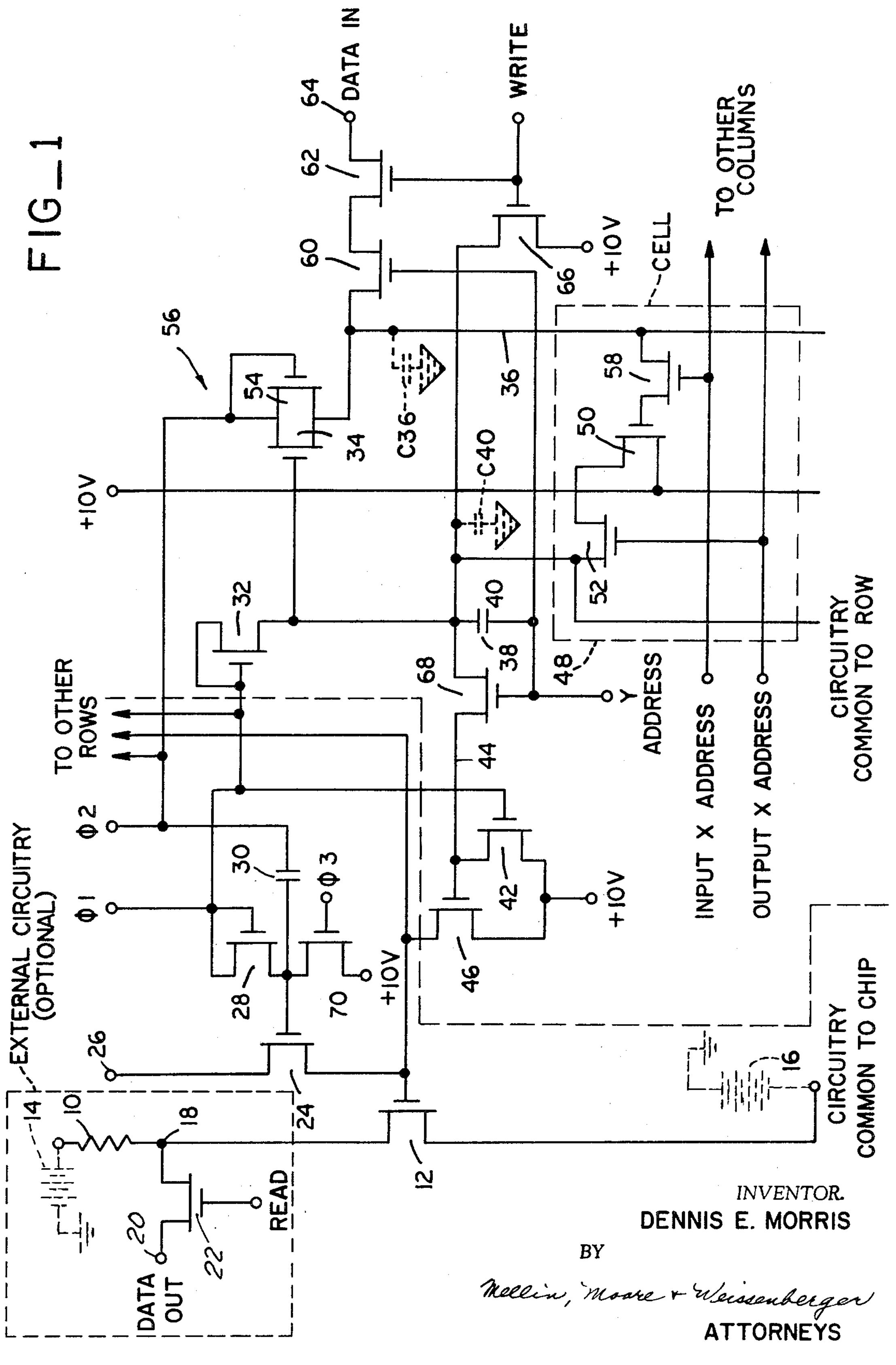
FIG. 1 is a circuit diagram of the device of this invention.
Figure 2:
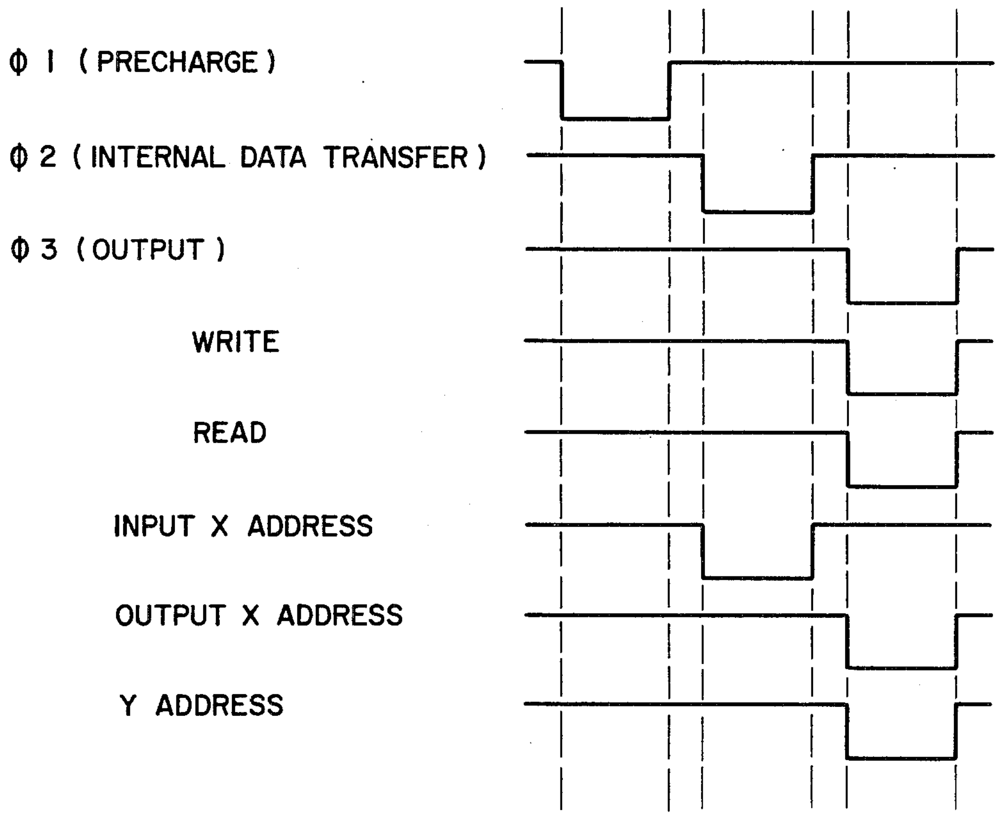
FIG. 2 is a time-amplitude graph showing the time relation of the clock pulses used with the device of this invention.

Referring to FIG. 1 in the light of the pulse diagram of FIG. 2, the output circuit of a MOSFET chip constructed in accordance with this invention consists of a load resistor 10, connected in series with an output gate 12 between DC bias sources 14 and 16 of differing potential. If the bias source 14 is relatively positive, and the bias source 16 relatively negative, the potential at junction 18 will be logic "1" when output gate 12 is enabled, and logic "0" when output gate 12 is blocked.

The logic state of junction 18 can be read at the data-out terminal 20 at an appropriate time in the operational cycle by energizing the read gate 22.

To permit extra-fast switching of the output gate 12, a low prebias is applied to the gate electrode of output gate 12 through prebias gate 24 from a prebias source 26. The prebias source 26 is of such potential as to keep the gate electrode of output gate 12 just barely above threshold. It will be noted that the output gate 12 is thus normally maintained in a logic "1" state, and that it is switched to the logic "0" state only when a "0" readout occurs (and also during the write operation, as explained hereinbelow). Due to the near-threshold prebias of the gate electrode of output gate 12, the switching from the logic "1" state in response to the "0" readout is essentially instantaneous.

In operation, the cycle starts with the appearance of the $\theta 1$ pulse. The appearance of the $\theta 1$ pulse enables precharge gate 28 and charges the gate electrode of prebias gate 24 as well as capacitor 30 to the negative $\theta 1$ clock potential. (Capacitor 30 is a bootstrapping element and serves to drive prebias gate 24 "on" harder when the subsequent appearance of the $\theta 2$ pulse brings the voltage on its right side to logic "1"). At the same time, the $\theta 1$ pulse enables isolating gate 32 and thus precharges the gate electrode of inverter input 34 to negative clock potential. Inasmuch as $\theta 2$ is at ground at this moment, the enabling of inverter input 34 grounds the data in bit line 36 if it is not already grounded.

The appearance of the $\theta 1$ pulse also charges capacitor 38 to negative clock potential (Y address being at ground at this time) so as to hold the data-out bit line 40 at negative clock potential. At the same time, the $\theta 1$ clock pulse enables buffer precharge gate 42 and thus brings the buffer line 44 to +10 v., which causes buffer gate 46 to be blocked. Thus, during the $\theta 1$ pulse, the output junction 18 is maintained at logic "1."

The logic condition of each individual memory cell 48 is expressed by the enabled or blocked condition (representing logic "1" and logic "0," respectively) of the memory gate 50.

When the $\theta 1$ pulse terminates, isolating gate 32 becomes blocked, and the data-out bit line 40 remains at negative clock potential due to the charge on its own bit line capacitance $C_{40}$ and on the auxiliary capacitor 38. When the $\theta 2$ pulse now appears, the X-address gate 52 of the addressed cell 48 is enabled. If the cell 48 was in the logic "1" condition, the data-out bit line 40 becomes connected to the +10 v. supply through memory gate 50 and X-address gate 52. On the other hand, if the cell was in the logic "0" condition, memory gate 50 is blocked and the data-out bit line 40 remains at negative clock potential.

The appearance of the $\theta 2$ pulse also enables the precharger 54 of the inverter 56 and causes the data-in bit line 36 to go to negative clock potential. After the cessation of the $\theta 2$ pulse, the state of the data-in bit line 36 is dictated by the condition of the data-out bit line 40. Inasmuch as the data-out bit line 40 is directly connected to the gate of inverter input 34, inverter input 34 is blocked if the memory cell 48 was at logic "1" and is enabled if the memory cell 48 was at logic "0."

Consequently, if the memory cell was at logic "1," the now-grounded $\theta 2$ clock is isolated from the data-in bit line 40, and the data-in bit line 36 remains at negative clock potential due to the action of its own inherent bit line capacitance $C_{36}$. On the other hand, if the memory cell was at logic "0," inverter input 34 is enabled, and the data-in bit line is driven back to ground by the now-grounded $\theta 2$ clock.

Upon the appearance of the $\theta 3$ pulse, X-address gate 58 in the memory cell 48 is enabled, and the logic state of the data-in bit line 36 is transferred to the gate electrode of memory gate 50. It will be seen that the $\theta 3$ pulse thus serves as a refresh pulse, inasmuch as the enabling of X-address gate 58 will of necessity refresh the previously existing logic state of the gate electrode of memory gate 50.

The appearance of the $\theta 3$ pulse, by energizing the Y address, also enables data input gate 60. If a write operation is to be performed instead of the restoring operation, a write pulse is applied to the write gate 62. This connects the external data source 64 to the data-in bit line 36, and the data to be written is substituted for the restoring data supplied by the inverter.

During a write operation, the inverter 56 is disabled by applying the write pulse to inverter-disabling gate 66. This causes a positive bias to be applied to the data-out bit line 40 and blocks inverter input 34.

The appearance of the $\theta 3$ pulse also enables Y-address gate 68. This causes the logic state of the data-out bit line 40 and of capacitor 38 to be transferred into the buffer line 44, where it enables the buffer gate 46 if the memory cell was at logic "0," or maintains the buffer gate 46 blocked if the memory cell was at logic "1." In the former case, output gate 12 becomes blocked by the application of the +10 v. supply to its gate electrode through the buffer gate 46; in the latter case, the gate electrode of output gate 12 retains its previous energization. In either case, the $\theta 3$ pulse, by enabling prebias disabling gate 70, applies a +10 v. bias to prebias gate 24 to cut off the prebias supply to output gate 12 during the $\theta 3$ pulse.

It will be noted that when buffer gate 46 is to be enabled by a logic "0" memory state, the upper end of capacitor 38 is charged to $\theta 1$ potential, say −10 v., with respect to the Y address supply just prior to the $\theta 3$ pulse. Conversely, for a logic "1" memory state, the upper end of capacitor 38 is at +10 v. with respect to the Y address supply just before the $\theta 3$ pulse.

When the $\theta 3$ pulse occurs on a memory "0" cycle, a voltage division occurs between the then-appearing −10 v. level of the Y address supply and ground across the series connection of capacitor 38 and bit line capacitance $C_{40}$. The relatively large capacitance of capacitor 38 aids the maintenance of the logic "1" level in line 40, thus assuring fast switching of buffer gate 46 even though this switching operation relies on a charge transfer between data-out bit line 40 and the gate electrode of buffer gate 46, rather than on a connection of buffer gate 46 to a low-impedance power supply.

If the $\theta 3$ pulse occurs on a memory "1" cycle, the upper end of capacitor 38 merely drops from +10 v. to ground potential when Y address goes negative and buffer gate 46 does not switch.

During a write operation, the effect of the logic state of the data-out bit line 40 is overridden by the enabling state of inverter-disabling gate 66 by the write pulse. Consequently, a write operation will always produce a +10 v. potential in the data-out bit line 40, and buffer gate 46 is always blocked during a write operation.

It follows from the above description that the logic state of output junction 18 can be read to provide a data output from the chip at any time between the onset of the $\theta 3$ pulse and the onset of the following $\theta 1$ pulse. At all other times, the output junction 18 is held at logic "1" by the prebias circuit.

I claim:

1. A ratioless random-access memory array comprising:
- a. a plurality of memory cells each including a memory element switchable between a conductive and a nonconductive state;
- b. a source of DC potential representing a first logic state;
- c. first bit line means;
- d. precharge means operative during a first portion of the operational cycle of said memory array for precharging said first bit line means to a precharge potential representing a second logic state;
- e. first thickness means in each of said cells responsive to a selected first address coordinate of the addressed cell and operative during a second portion of said operational cycle to connect said first bit line means to said DC potential source through said memory element so as to change the logic state of said first bit line if the said memory element is conductive;
- f. second bit line means;
- g. second address means in each of said cells responsive to said first address coordinate but operative during a third portion of said operational cycle to connect said memory element to said second bit line means so as to switch said memory element to the conductivity state determined by the logic state of said second bit line means; and
- h. inverter means interposed between said first and second bit line means to produce, during said third portion of said operational cycle, a logic state which is the inverse of the logic state existing in said first bit line means during said second portion of said operational cycle.

2. The array of claim 1, in which each of said cells has a second address coordinate, and which there is a plurality of first and second bit line means, any given first and second bit line means being common to all cells whose second address coordinate is the same; and second address means responsive to a selected second address coordinate for connecting a selected one of said bit line means to data output circuit means.

3. The array of claim 1, further comprising a source of write pulses, a source of input data, and means responsive to the appearance of write pulse to disable said inverter means and to connect said second bit line means to said input data source.

4. A random-access memory array, comprising:
- a. a plurality of individually addressable memory cells;
- b. first bit line means;
- c. means for establishing in said first bit line means a logic state opposite to the logic state of an addressed memory element;
- d. second bit line means;
- e. inverter means connected between said first and second bit line means to establish in said second bit line means a logic state equal to the logic state of said addressed memory element; and
- f. means for establishing in said memory element the logic state of said second bit line means.

5. The array of claim 4, in which the establishment of said opposite logic state in said first bit line means does not affect the logic state of said memory element.

6. The array of claim 4, in which all of said logic state establishing means are ratioless.

7. The array of claim 4, further comprising writing means arranged to selectively disable said inverter means and establish in said second bit line means the logic state of externally supplied input data.

8. A random-access memory array, comprising:
- a. a plurality of individually addressable memory cells;
- b. bit line means;
- c. means for establishing in said bit line means a logic state indicative of the logic state of an addressed memory cell;
- d. output circuit means including output gate means;
- e. prebias means arranged to maintain said output gate means in a first logic state but at a potential just sufficient to prevent its switching to the opposite logic state;
- f. means for disabling said prebias means during a predetermined portion of the operational cycle of said array; and
- g. buffer means responsive to the logic state in said but line for biasing said output gate means into said opposite logic state during said predetermined portion of said operational cycle upon the presence of a predetermined logic state in said bit line.

9. The array of claim 8, in which said predetermined bit line logic state is the same as said first logic state of said output gate means.

10. The array of claim 8, further comprising precharge means for precharging said buffer means into a predetermined logic state during a first portion of the operation cycle of said array, and address gate means for rendering said buffer means responsive to said bit line logic state during a second portion of said operational cycle.

11. The array of claim 10, further comprising capacitive means connected between said but line means and said address gating means so as to increase, during said second portion of said operational cycle, the bit line logic potential available to change the logic state of said buffer means.

* * * * *